H. L. DAWSON.
GAGE.
APPLICATION FILED NOV. 21, 1908.
1,219,264.
Patented Mar. 13, 1917.
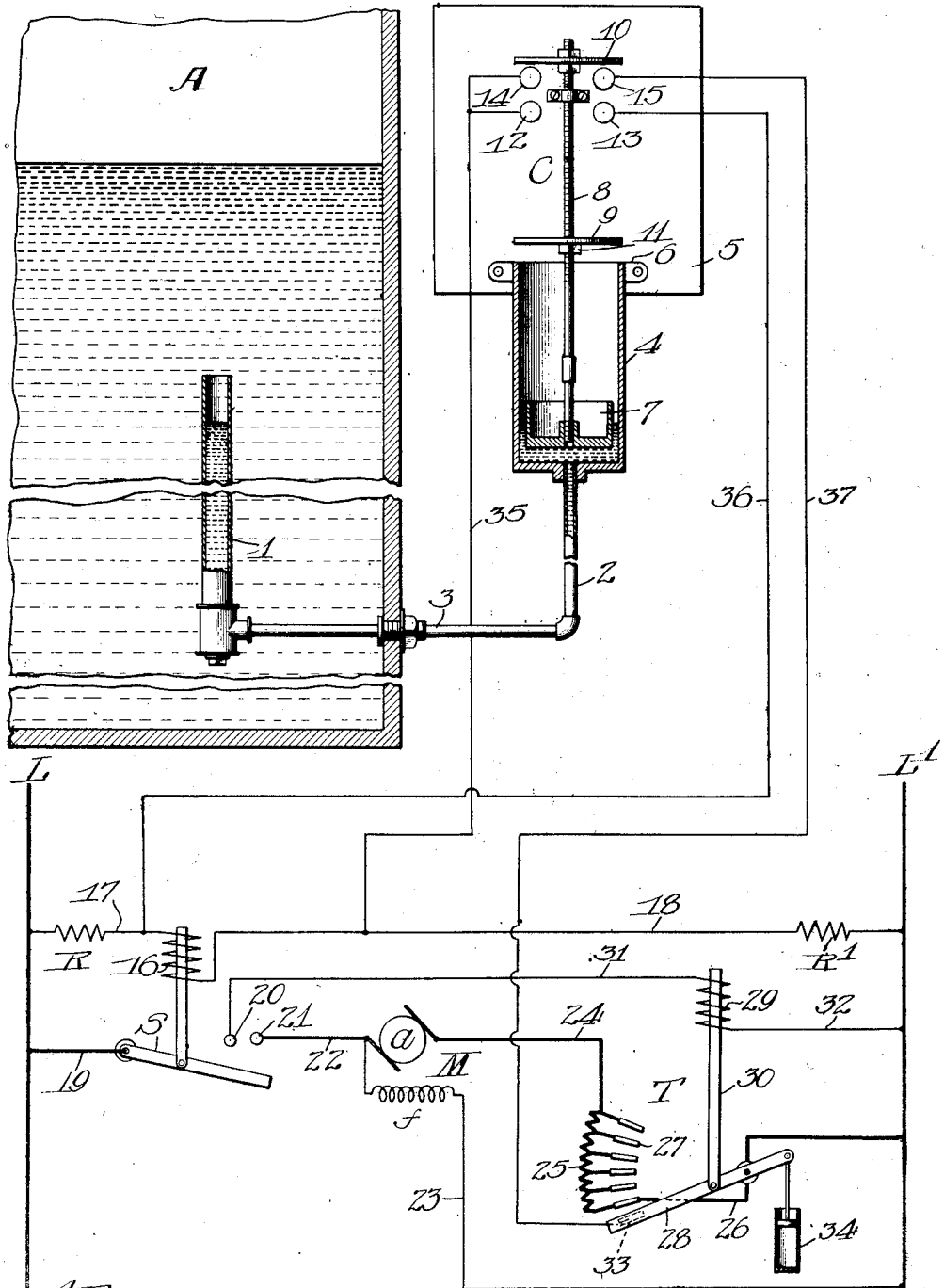
Witnesses:
Robert N. Weir
Shepler W. Fitzgerald
Inventor:
Horace L. Dawson
By Edwin B. H. Tower Jr.
Attorney.

UNITED STATES PATENT OFFICE.

HORACE L. DAWSON, OF EVANSTON, ILLINOIS, ASSIGNOR TO THE CUTLER-HAMMER MFG. CO., OF MILWAUKEE, WISCONSIN, A CORPORATION OF WISCONSIN.

GAGE.

1,219,264.  Specification of Letters Patent.  Patented Mar. 13, 1917.

Application filed November 21, 1908. Serial No. 463,752.

*To all whom it may concern:*

Be it known that I, HORACE L. DAWSON, a citizen of the United States, residing at Evanston, in the county of Cook and State of Illinois, have invented new and useful Improvements in Gages, of which the following is a full, clear, concise, and exact description, reference being had to the accompanying drawing, forming a part of this specification.

My invention relates to improvements in gages. It applies more particularly to gages which are used for measuring the level of a liquid in a tank, and which, through the agency of suitable means, controls the amount of liquid supplied to the tank. There are other applications of my invention, however, so it should be understood that the structure which I show and describe herein is selected merely for the purpose of illustration and should not be construed as a limitation upon the construction and application of my invention.

The object of my invention is to provide a gage, the operation of which will not be affected by the action of thermic conditions upon the fluid by which it is actuated.

A gage constructed in accordance with my invention is especially appropriate for controlling the level of water in a tank which is placed out of doors, as its operation is not defeated when the surface of the water in the tank freezes, as is the case with float gages.

According to the preferred form of my invention, I provide a member which is preferably provided with two up-standing communicating tubes, one adapted to protrude into the inside of the tank and the other arranged on the outside of the tank.

I shall assume, for the purpose of illustration, that an electric motor is used to drive a pump for supplying liquid to a tank, in which case I provide suitable instrumentalities for starting and stopping the motor, which are controlled by means of the gage. Of course, the gage may be used to control other devices and it may serve to measure other conditions than the level of a liquid in a tank, as, for instance, it may measure the pressure of a fluid in a reservoir.

In the accompanying drawing I have illustrated one form of my invention as used for measuring the level of a fluid in a tank, a portion of the tank being shown in section. I have also diagrammatically shown a relay, a main switch, a motor, and an automatic rheostat.

In the gage shown in the drawings I provide two up-standing tubes, 1 and 2, which are connected at their lower ends by a transverse tube 3. The tube 1 is disposed inside of a tank A, in which a predetermined quantity of liquid is to be maintained, and the tube 3 is shown as extending through one wall of the tank. The tubes 1, 2 and 3, are preferably partially filled with mercury, though I desire it to be understood that I may employ any other suitable liquid. I preferably secure a cylinder 4 to the outer tube 2, of greater diameter than the inner tube, so that when the height of the mercury changes a certain distance in the inner tube, due to a change in the level of the liquid in the tank, the change in height thereof in the inner tube and the cylinder will be inversely proportionate to the square of the respective diameters of the inner tube and the cylinder. In other words, by utilizing the enlarged cylinder 4 the extent of movement of any device associated with the gage may be reduced. The cylinder 4 is supported upon a panel 5 by means of standards 6.

As shown in the drawing, the relay C consists of a float 7 adapted to rest upon the surface of the mercury and be actuated by the movement thereof. A rod 8 is secured to and extends upwardly from the float and has its upper portion screw-threaded. Contact disks 9 and 10 are threaded upon said rod, and when adjusted to desired positions, are clamped in place by means of nuts 11. The disks 9 and 10 are adapted, under certain conditions, to engage stationary contacts 12—13 and 14—15 respectively, which are secured to the panel 5.

The current for operating the different devices illustrated is supplied by main lines L and L'. The relay is shown as controlling the operation of a main switch S. The main switch is operated by a solenoid winding 16, which is connected to the lines L and L' by conductors 17 and 18 respectively, resistances R and R' being connected on each side of the winding. The resistance R is employed to protect the winding 16 against excessive currents, while the resistance R' prevents the closure of the switch S under normal conditions, as hereinafter set forth. The main switch S is connected to the line L by conductor 19 and, when closed, is adapted to engage stationary contacts 20 and 21.

A motor M, adapted to operate a pump (not shown) for supplying liquid to the tank A, has one terminal of its field f connected to the contact 21 by conductor 22, and the other terminal thereof by conductor 23 to the line L'. I have provided an automatic rheostat T for protecting the armature a against an excessive rush of current during starting. One terminal of the armature is connected to the conductor 22, while the other terminal thereof is connected by conductor 24 to one side of the resistance 25 controlled by said rheostat; the other side of said resistance being connected to the line L' by conductor 26. Rheostat T comprises a series of contacts 27, connected at intervals to the resistance 25, an arm 28, a solenoid winding 29, and a core 30, pivoted to the arm 28. The winding 29, when energized, is adapted to raise its core and move the arm 28 over the series of contacts to cut out the resistance 25 from the armature circuit. The winding 29 is connected by conductors 31 and 32 to the contact 20 and the line L', respectively. The arm 28, in its initial position, is adapted to engage a contact 33. The rate of movement of the arm 28 is preferably controlled by a dash-pot 34. The relay C is electrically connected to the other devices shown, as follows: the contacts 12 and 14 by conductor 35 to conductor 18; the contact 13 by conductor 36 to conductor 17, and the contact 15 by conductor 37 to contact 33.

The operation of the devices will now be explained. Suppose the level of the liquid in the tank has been lowered to a predetermined minimum height, the pressure of said liquid upon the column of mercury will diminish sufficiently to allow the mercury to lower in the cylinder 4 until the disk 10 engages the stationary contacts 14 and 15. A circuit will thus be established, as follows: from line L by conductor 17 and protective resistance R, winding 16, conductors 18 and 35, across disk 10, conductor 37, to contact 33, and by switch arm 28 and conductor 26 to the line L'. It will thus be seen that a circuit for the winding 16 will be established, excluding the resistance R'. Said winding is, therefore, sufficiently energized to raise its core and close switch S. Circuit through the motor is thus closed, the resistance 25 being in series with the armature. The circuit of the winding 29 is also closed by switch S and will move the arm 28 over the series of contacts 27 to short-circuit the resistance 25. As soon as the motor is started and has raised the level of the liquid in the tank slightly, the increased pressure thereof will cause the column of mercury to raise the disk 10 out of engagement with the contacts 14—15. The switch S, however, will remain closed, as a maintaining circuit is provided through the resistance R', which, while initially preventing the closure of the switch, will allow sufficient current to pass to retain the switch in closed position.

It will thus be seen that the motor will be brought up to full speed and kept in operation until the liquid has been raised to a predetermined maximum height. When the maximum height is reached, the disk 9 will complete a circuit from conductor 17 by conductors 36 and 35 to conductor 18. The winding 16 is, therefore, shunted and will become deënergized and allow the switch S to open and break the motor circuit. The winding 29 of the rheostat will also be deënergized and will allow the arm 28 to return to initial position so that the resistance 25 will again be placed in series with the armature a of the motor.

What I claim as new and desire to secure by Letters Patent is:—

1. The combination with a fluid receptacle, of a fluid containing gage therefor having a portion within said receptacle and a communicating portion without the same, said first mentioned portion having an opening at a distance from all walls of said receptacle for subjecting the fluid contained by said gage to the pressure of the fluid in said receptacle and a circuit closer responsive to variations in the level of fluid within the portion of said gage without said receptacle.

2. The combination with a liquid containing receptacle, of a level indicating gage therefor comprising an open tube submerged within said receptacle and spaced from all walls thereof and a communicating tube without said receptacle, said tubes containing fluid subject to the pressure of the liquid within said receptacle and a circuit closer responsive to variations in the level of fluid within the second mentioned tube.

3. The combination with a fluid receptacle, of a gage therefor comprising a substantially U-shaped tubular member containing fluid, one of the uprights of said member being submerged within said receptacle and the other extending without the same and said outer upright having a portion of larger diameter than said inner upright whereby variations in the level of the fluid in said outer upright will be less than but proportional to variations in the level of the fluid in said inner upright and a circuit closer responsive to variations in the level of fluid within said outer upright.

4. The combination with a fluid receptacle, of a gage therefor comprising a substantially U-shaped tubular member containing fluid, one of the uprights of said member being submerged within said receptacle and the other extending without the same and said outer upright having a portion of larger diameter than said inner upright whereby variations in the level of the fluid in said outer upright will be less than but proportional to variations in the level of the fluid in said inner upright and a device including a float responsive to fluid level variations in said upright portion of larger diameter.

5. The combination with a fluid container, of means responsive to the variations in the level of the fluid therein, said means comprising a substantially U-shaped gage having one upright within and the other without said container, a float arranged in the outer upright and a plurality of switches operable by said float, said switches being arranged for closure upon movement of said float in opposite directions.

6. The combination with a fluid container, of means subject to variations in the level of the fluid therein, said means comprising a gage having an opening submerged within said receptacle and an enlarged portion without the same, a float in said enlarged portion, and a plurality of independently adjustable contact devices operated by said float.

In witness whereof, I have hereunto subscribed my name in the presence of two witnesses.

HORACE L. DAWSON.

Witnesses:
F. G. Hoole,
R. I. Phillips.